United States Patent [19]

Hagen et al.

[11] Patent Number: 5,492,627
[45] Date of Patent: Feb. 20, 1996

[54] METHOD FOR SEPARATING MERCURY FROM FLUIDS USING COMPOSITE ARTICLES

[75] Inventors: Donald F. Hagen, Woodbury; Wanda Bahmet, St. Paul; Louis C. Haddad, Mendota Heights; Robert E. Perkins, Oakdale, all of Minn.

[73] Assignee: Minnesota Mining and Manufacturing Company, St. Paul, Minn.

[21] Appl. No.: 268,286

[22] Filed: Jun. 29, 1994

[51] Int. Cl.⁶ .................................................... B01D 61/00
[52] U.S. Cl. .......................... 210/651; 210/653; 210/503; 210/502.1; 210/914; 95/82; 95/88; 423/99
[58] Field of Search .................... 210/656, 651, 210/653, 503, 508, 509, 500.25, 500.26, 500.38, 656, 658, 659, 198.2, 502.1, 914, 688; 95/82, 88; 423/99

[56] References Cited

U.S. PATENT DOCUMENTS

| | | | |
|---|---|---|---|
| 3,824,169 | 7/1974 | van Osch et al. | 204/195 M |
| 3,849,533 | 11/1974 | Hetz | 423/99 |
| 4,153,661 | 5/1979 | Ree et al. | 264/127 |
| 4,230,486 | 10/1980 | Capuano et al. | 423/99 |
| 4,460,642 | 7/1984 | Errede et al. | 428/283 |
| 4,810,381 | 3/1989 | Hagen et al. | 210/502.1 |
| 4,892,567 | 1/1990 | Yan | 55/33 |
| 4,906,378 | 3/1990 | Hagen et al. | 210/635 |
| 4,971,736 | 11/1990 | Hagen et al. | 264/22 |
| 5,019,232 | 5/1991 | Wilson et al. | 204/182.8 |
| 5,071,610 | 12/1991 | Hagen et al. | 264/120 |
| 5,147,539 | 9/1992 | Hagen et al. | 210/198.3 |
| 5,238,621 | 8/1993 | Hagen et al. | 210/656 |
| 5,271,760 | 12/1993 | Markovs et al. | 75/670 |
| 5,322,628 | 6/1994 | Yan | 210/673 |
| 5,340,746 | 8/1994 | Hagen et al. | 436/109 |
| 5,391,217 | 2/1995 | Zuche | 210/914 |

FOREIGN PATENT DOCUMENTS 55084536  6/1980  Japan .

OTHER PUBLICATIONS

Derwent Abstract 01853690, with an English language translation of Patent Kokai No. SHO 52[1977]–105578.
Hagen et al., "Membrane Approach to Solid Phase Extractions", *Analytica Chimica Acta*, 236, 157–164 (1990).
Markell, et al., "New Technologies in Solid Phase Extraction", *LC/GC*, vol. 9, No. 5, 1991.
*Z. Anal. Chem.*, 271–274 (1975).
*Analytica Chimica Acta*, 107, pp. 159–167 (1977).
*Analytical Chemistry*, 43, pp. 1511–1512 (1971).
*Analytica Chimica Acta*, 106, pp. 405–410 (1979).
*Analytica Chimica Acta*, 220, pp. 257–261 (1989).
Chemical Abstracts 111:83762j.

*Primary Examiner*—Ana M. Fortuna
*Attorney, Agent, or Firm*—Gary L. Griswold; Walter N. Kirn; Lorraine R. Sherman

[57] ABSTRACT

Composite articles are useful for separating mercury from fluids. The composite articles can be porous supports comprising an inert substrate having immobilized thereon finely divided gold optionally in combination with a tin salt coating. The porous support can be a particulate or porous fibrous webs. Alternatively, the composite articles can comprise a porous fibrous membrane having enmeshed therein the aforementioned porous supports which can be in particulate or fibrous forms. The method for separating elemental, ionic, or organic mercury in fluids comprises the step of contacting and passing a fluid containing mercury through a support comprising a porous, high surface area, inert substrate on which is immobilized finely divided elemental gold at a controlled rate for a time sufficient for the mercury to sorb to the elemental gold and to provide an immobilized gold-mercury amalgam on the support. If a tin salt also is immobilized on the inert substrate, mercury-tin salt can also be formed. In a further, and optional, step, elemental mercury can be removed from the support and optionally can be quantified.

15 Claims, No Drawings

METHOD FOR SEPARATING MERCURY FROM FLUIDS USING COMPOSITE ARTICLES

TECHNICAL FIELD

This invention relates to composite articles for use in concentrating or separating mercury in fluids.

BACKGROUND OF THE INVENTION

Currently a good deal of interest has been generated in the analytical community in particle loaded membrane technology and its applications for solid phase extractions as discussed by Hagen et al., "Membrane Approach to Solid Phase Extractions", *Analytica Chimica Acta,* 236, 157–164, 1990, and by Markell et al., "New Technologies in Solid Phase Extraction", LC/GC Volume 9 Number 5, 1991. This technology has been shown to be useful for isolation of hydrophobic organic pollutants by adsorptive interactions and has demonstrated the advantages of fast diffusion kinetics when small, high surface area particles are packed closely together in uniform membranes with little or no channeling and with controlled porosity. Van Osch et al. have described a membrane (i.e., a "pellet impervious to a solution of ions) for ion electrodes, *Z. Anal. Chem.* 271–4, 1975. Solid "membranes" disclosed in U.S. Pat. No. 3,824, 169 are imporous (non-porous), chemically inert, composites of gold and salts pressed into pellets which are used in potentiometric electrode technology. Solid "membranes" are distinct from porous particle loaded articles disclosed in U.S. Pat. Nos. 4,153,661, 4,460,642, 4,810,381, 4,906,378, 4,971,736, 5,019,232, 5,071,610, and 5,147,539 for applications in separation science utilizing solid phase extractions.

Particle-loaded, non-woven, fibrous articles wherein the non-woven fibrous web can be compressed, fused, melt-extruded, air-laid, spunbonded, mechanically pressed, or derived from phase separation processes have been disclosed as useful in separation science. Sheet products of non-woven webs having dispersed therein sorbent particulate have been disclosed to be useful, for example, in respirators, protective garments, fluid-retaining articles, and as wipes for oil and/or water, and as chromatographic and separation articles. Coated inorganic oxide particles have also been enmeshed in such webs.

Contamination of fluids by mercury has been a long-standing environmental concern. Preconcentration or separation of mercury by amalgamation with gold, as a precursor to quantitative analysis of the mercury, has been described. U.S. Pat. No. 3,849,533 discloses powdered carrier material impregnated with a noble metal salt, such as, e.g., silver nitrate, as an absorption medium for mercury. Gold-coated sea sand has been described as a mercury trap in *Analytica Chimica Acta* 107 pp. 159–167 (1977), as has gold-coated powdered pumice (Japan Kokai 55 084536, Derwent Abstract). A gold-coated fritted glass disk has been described for mercury collection in *Analytical Chemistry* 43, pp. 1511–2 (1971). Particulate material is typically described in connection with an extraction column apparatus in which mercury vapor or mercury-containing liquid are passed over the absorbing particulate in a column, after which the absorbing particulate is heated to drive off mercury for direct analysis by, e.g., atomic absorption spectrometry (AAS). In the case of the glass disk, the disk itself was heated to drive off mercury for analysis.

Other references in which gold-coated supports have been used to determine mercury include *Analytica Chimica Acta* 106, pp 405–410 (1979), *Analytica Chimica Acta* 220, pp. 257–261 (1989), Chemical Abstracts 111: 83762j (1989), U.S. Pat. Nos. 5,322,628, 5,271,760 and 4,892,567.

SUMMARY OF THE INVENTION

Briefly, the present invention provides a novel method for separating mercury from fluids comprising contacting and passing a fluid comprising mercury (elemental, ionic, or organic mercury) through a porous support which can be particulate, coated particulate, coated fiber, or any other porous, high surface area support, on the surface of which is immobilized finely divided elemental gold optionally in combination with a tin salt coating.

The supports of the invention can be particulate or fibers that can be packed in a column and challenged with a fluid comprising mercury as an analyte in order to separate or concentrate the mercury.

In another aspect, the present invention provides the supports disclosed above (in particulate or fiber form) entrapped in a porous, nonwoven fibrous web. These webs can be at least one of polyamide, PTFE, polyolefin, glass, ceramic, or quartz. Preferably, the supports (particulate or fibers) are enmeshed in a porous polytetrafluoroethylene (PTFE) fibrillated matrix. The PTFE composite matrix provides an easily handleable article for use in the method of the present invention.

Preparation of porous supports on which finely divided gold is immobilized may be provided by directly coating the support with elemental gold (e.g., by sputtering) or by coating a porous inert support with a gold salt (preferably gold chloride) solution. The coated gold salt is then reduced to elemental gold by methods well known in the art. See, for example, W. Romanowski, "Highly Dispersed Metals", John Wiley & Sons, New York (1987) 52–57. Preferred methods for reducing ionic gold to elemental gold include treatment with formaldehyde solution or stannous salt (preferably stannous chloride) solution.

In a preferred embodiment, a PTFE fibrillated matrix having reactive or sorptive supports enmeshed therein is made by well-known methods. Preferably, it is made by the method disclosed in U.S. Pat. No. 5,071,610, Example 1, which is incorporated herein by reference for preparation of PTFE fibrillated matrices.

In a further aspect, the particulate comprising immobilized gold and optionally a tin salt can be used in a method of concentrating or separating elemental mercury from fluids, the method comprising the step of a) contacting and passing a fluid comprising at least one of elemental and ionic mercury as an analyte through a porous support comprising a porous, high surface area substrate on which is immobilized finely divided elemental gold and optionally a tin salt to provide a gold-mercury amalgam and optionally a mercury-sorbed tin salt.

Where the mercury is in the form of ionic mercury (i.e., $Hg^+$ or $Hg^{++}$), the method can further comprise the step of b) converting ionic mercury to elemental mercury prior to or simultaneous with step a) above.

Where the mercury is in the form of organic mercury (i.e., R-Hg, wherein R is an organic group that covalently bonds to Hg), the method can further comprise the step of converting organic mercury to ionic mercury prior to step b) above. One method includes conversion of organic mercury to ionic mercury using, for example, permanganate oxidation. See, for example, F. A. J. Armstrong et al., ATOMIC ABSORPTION NEWSLETTER 10(5), September–October 1971.

In a still further aspect, the elemental mercury can be recovered from the resulting gold-mercury amalgam for further characterization. This can be accomplished by dissolving the gold-mercury amalgam and the optionally present mercury-sorbed tin salt with aqua regia or by heating.

In a yet further aspect, the present invention provides a support comprising an inert, porous, high surface area substrate, as previously described, on which is immobilized finely divided elemental gold-mercury amalgam. The supports can be packed in a column or enmeshed in a porous fibrous membrane, as described herein. In this aspect, there can be provided analytical standards wherein known levels of mercury are present for calibration purposes using novel supports comprising an inert, porous, high surface area substrate, as previously described, on which is immobilized finely divided elemental gold-mercury amalgam.

In this application:

"immobilized gold" means gold that is tightly bound to a porous substrate so that the gold cannot be mechanically removed, e.g., by washing; the gold is finely divided and under an electron microscope appears as "islands" or "domains" having an approximate size (largest dimension or largest diameter) generally in the range of 1 to 100 nm, preferably 5 to 50 nm, more preferably 10 to 20 nm;

"immobilized gold-mercury amalgam" means a solid solution of mercury and gold which is tightly bound to a porous substance; the gold-mercury amalgam is finely divided and under an electron microscope appears as "islands" or "domains" having an approximate size (largest dimension) generally in the range of 1 to 100 nm, preferably 5 to 50 nm, more preferably 10 to 20 nm.

"void volume" means the volume of the vacancies in the structure of a composite;

"web" or "membrane" means a porous sheet material that can be fibrous or nonfibrous; preferably it has a void volume in the range 30 to 80 percent, preferably 55 to 65 percent, with a pore size of 0.4 to 2.5 micrometers (4 to $25 \times 10^2$ nm), preferably 0.6 to 0.8 micrometers (6 to $8 \times 10^2$ nm);

"matrix" means an open-structure entangled mass of microfibers;

"particles" or "particulate" means porous inert substrates with solid shapes (not including PTFE) preferably having an average diameter 0.1 to 200 micrometers, more preferably an average diameter of 1 to 40 micrometers, even more preferably an average diameter of 5 to 25 micrometers, and most preferably an average diameter of 10–15 micrometers, with an aspect ratio of 1 to 1,000,000; and "porous support" means a porous particle, a collection of porous particles, or a porous web.

As noted above, the articles can comprise porous fibrous membranes which preferably comprise a polytetrafluoroethylene (PTFE) fibril matrix having enmeshed therein porous supports (particles), or they can comprise packed beds (columns) of the porous supports. The articles can be used in a method of concentrating or separating mercury (elemental, ionic, or organic) from fluids, as described above.

The present invention method for separating mercury from a fluid has been found to be advantageous over conventional methods which use particles in a bed or cartridge in that there is achieved efficient adsorption of mercury at high flow rates, with less plugging (because of larger surface area gold-coated particles), and faster mass transfer. The high surface area porous particulate of very small average size, preferably enmeshed in a porous web, makes these desirable achievements possible. Additionally, efficiency is enhanced because of low pressure drop in particle-loaded webs. When inert porous matrices, such as polytetrafluoroethylene are used, dissolution of gold and mercury can be accomplished by aqua regia, or preferably, modified aqua regia in which hydrochloric acid is replaced by hydrobromic acid. Use of modified aqua regia overcomes problems of mercury chloride adhering to solid surfaces in the analytical apparatus, when dissolution takes place. The mercury bromide solution overcomes the well-known problems associated with mercury salt deposition in the analytical apparatus when using Inductively Coupled Argon Plasma Emission Spectroscopy (ICP). In many cases, fibrous webs or membranes cannot withstand treatment with aqua regia or modified aqua regia. The gold and mercury can also be desorbed by high pH cyanide solution. In such a case a minimal amount of high surface area gold on high surface area particulate may be desirable so that low concentrations of cyanide can be used. When the novel particulate is in a bed or incorporated in a porous, fibrous web, mercury alone can be desorbed by heating, provided that when the porous, fibrous web is present, it is stable at the elevated temperatures required for the mercury desorption. In such cases the gold coated particles in a bed or particle-loaded web can be reused.

The gold-coated particulate (in or out of a web) is advantageous over simple gold coated sand or gold films because of the high surface area which is provided. This allows faster and more efficient adsorption of elemental mercury. Alumina or zirconia supports are preferred when desorption is desired because they are essentially inert to aqua regia or cyanide at high pH and because they can be prepared with high surface area. Use of low or ambient temperatures for the desorption process allows use of certain temperature-sensitive webs for enmeshing gold-coated particles.

DETAILED DESCRIPTION OF PREFERRED EMBODIMENTS

In this invention, interactions on a solid phase are utilized to convert insoluble elemental gold in a bed of supports or in a kinetically optimized composite porous web to a gold-mercury amalgam. Advantage is taken of rapid diffusion kinetics to perform fast sorptive processes, namely the amalgamation of mercury with gold. Amalgamation, as is known in the art, is the forming of a solid solution of mercury with another metal, in this case gold. In the method of the invention, a sample fluid comprising mercury as an analyte is passed through a web or column comprising the gold coated supports of the invention.

Excessive amounts of gold should be avoided so that the method can be economically feasible. Preferably, porous supports can contain in the range of about 0.05 to 10% by weight of gold compared to weight of support, more preferably 0.5 to 6 weight percent, and most preferably 1 to 3 weight percent. This range can be extended for certain applications. Preferably, the immobilized high surface area gold has a surface area at least in the range of 5 to 100 m$^2$/g.

In one embodiment, the gold containing particulate is packed into beds or columns through which fluids containing mercury as an analyte are passed to convert the immobilized elemental gold into immobilized gold-mercury amalgam. More particularly, a high surface area particulate substrate such as silica, alumina, or zirconia, is coated preferably with an alcohol solution (e.g., using a combination HCl/methanol/hexane solvent) of gold chloride (preferably 1 to 10 weight percent or up to saturation of the solution), solvent is removed and gold chloride is subsequently reduced to elemental gold. Preferably, the particulate substrate has a surface area in the range of 20 to 800 m$^2$/g, more preferably, 100 to 350 m$^2$/g. The resulting supports can be used in the method of the invention in beds or cartridges or the supports can then be embedded in a fibrous web which preferably is a fibrillated PTFE membrane composite using the method disclosed for example, in U.S. Pat. No. 5,071,610, Example 1. In a second embodiment, a high surface area, uncoated, particulate (such as silica) loaded web is prepared according to methods disclosed in, for example, U.S. Pat. No. 5,071,610, Example 1. The enmeshed particulate in the composite web can subsequently be treated with a solution of a gold salt, such as gold chloride, and the gold salt which coats the surface and internal pores of the particulate is then reduced to metallic gold in-situ. In either case, it is desirable to use small high surface area particles which can be uniformly enmeshed in the matrix with controlled interstitial porosity.

In a second embodiment of the invention, wherein the challenging fluid contains ionic mercury ($Hg^{+1}$ or $Hg^{+2}$), reduction of mercury to elemental mercury and amalgamation can take place in a single step. This is made possible by sorbing a stannous salt, such as stannous chloride, onto at least a portion of the gold containing particulate. Ionic mercury in the challenging fluid is sorbed directly by the tin salt or reduced to elemental mercury which is then immobilized by formation of gold-mercury amalgam on the particulate. This one-step method eliminates the possibility of mercury vapor forming and losses due to its volatility. Useful amounts of stannous salt can be obtained, for example, by treatment with aqueous 5 percent by weight stannous chloride solution. In some cases, it may be desirable to treat the base particulate, prior to coating with gold, with a tin (preferably stannous) salt solution to reduce any ionic gold present to elemental gold.

A preferred method for preparing the preferred PTFE composite article of the invention comprises the steps of:

a) admixing lubricant (preferably water) with a blend comprising porous particulate and polytetrafluoroethylene (PTFE) particles to form a soft dough-like mass, the lubricant being present in an amount to exceed the sorptive capacity of the particulate by at least three weight percent, said mass having a cohesive consistency, and the ratio of particulate to PTFE preferably being in the range of 40:1 to 1:4;

b) intensively mixing said mass at a temperature and for a time sufficient to cause initial fibrillation of said PTFE particles;

c) biaxially calendering said mass between gaps in calendering rolls maintained at a temperature and for a time, while closing the gap between the calendering rolls with each successive calendering operation, to cause additional fibrillation of said PTFE particles to form a self-supporting sheet having a void volume in the range of 30 to 80 percent and a mean pore size in the range of 0.3 to 5.0 micrometers, wherein said void volume and mean pore size vary directly with and are controlled by the amount of lubricant present during processing.

More particularly, preparation of porous fibrous webs for entrapment of supports of the invention therein, can be as follows:

A. PTFE Membranes (Webs)

In one embodiment of the article of the present invention, an aqueous PTFE dispersion is used to produce a fibrillated web. This milky-white dispersion contains about 30% to 70% (by weight) of minute PTFE particles suspended in water. A major portion of these PTFE particles range in size from 0.05 µm to about 0.5 µm. Commercially available aqueous PTFE dispersions may contain other ingredients such as surfactants and stabilizers which promote continued suspension. Examples of such commercially available dispersions include Teflon™ 30, Teflon™ 30B, and Teflon™ 42 (DuPont de Nemours Chemical Corp.; Wilmington, Del.). Teflon™ 30 and Teflon™ 30B contain about 59% to 61% (by weight) PTFE solids and about 5.5% to 6.5% (by weight, based on the weight of PTFE resin) of a non-ionic wetting agent, typically octylphenyl polyoxyethylene or nonylphenyl polyoxyethylene. Teflon™ 42 contains about 32% to 35% (by weight) PTFE solids and no wetting agent (but does contain a surface layer of organic solvent to prevent evaporation).

The composite sheet article comprising fibrillated PTFE preferably is prepared as described in any of U.S. Pat. Nos. 4,153,661, 4,460,642, and 5,071,610, the processes of which are incorporated herein by reference, by blending the desired reactive supports into the aqueous PTFE emulsion in the presence of sufficient lubricant to exceed the absorptive capacity of the solids yet maintain a putty-like consistency. This putty-like mass is then subjected to intensive mixing at a temperature preferably between 40° and 100° C. to cause initial fibrillation of the PTFE particles. The resulting putty-like mass is then repeatedly and biaxially calendered, with a progressive narrowing of the gap between the rollers (while at least maintaining the water content), until shear causes the PTFE to fibrillate and enmesh the particulate and a layer of desired thickness is obtained. Removal of any residual surfactant or wetting agent by organic solvent extraction or by washing with water after formation of the sheet article is generally desirable. The resultant sheet is then dried. Such sheets preferably have a thickness in the range of 0.1 mm to 0.5 mm. Sheet articles with a thickness in the general range of 0.05 mm to 10 mm can be useful.

The void size and volume within such a membrane can be controlled by regulating the lubricant level during fabrication as described in U.S. Pat. No. 5,071,610. Because both the size and the volume of the voids can vary directly with the amount of lubricant present during the fibrillation process, webs capable of entrapping particles of various sizes are possible. For instance, increasing the amount of lubricant to the point where it exceeds the lubricant sorptive capacity of the particulate by at least 3% (by weight) and up to 200% (by weight) can provide mean pore sizes in the range of 0.3 µm to 5.0 µm with at least 90% of the pores having a size of less than 3.6 µm. This process can be used to create a web with supports enmeshed therein. The PTFE which forms the web within which particulate is to be trapped can be obtained in resin emulsion form wherein the PTFE and lubricant are already pre-mixed (e.g., Teflon™ 30 or 30B, DuPont de Nemours; Wilmington, Del). To this emulsion can be added additional lubricant in the form of water, water-based solvents such as a water-alcohol solution, or easily-removable organic solvents such as ketones, esters, and ethers, to obtain the aforementioned desired proportion of lubricant and particulate.

B. Non-PTFE Membranes (Webs)

In other embodiments of the present invention, the fibrous web can comprise non-woven, polymeric macro- or microfibers preferably selected from the group of polymers consisting of polyamide, polyolefin, polyester, polyurethane, polyvinylhalide, or glass, ceramic, or quartz fibers, or a combination thereof. If polyvinylhalide is used, it preferably comprises fluorine of at most 75% (by weight) and more preferably of at most 65% (by weight). Addition of a surfactant to such webs may be desirable to increase the wettability of the component fibers.

1. Macrofibers

The web can comprise thermoplastic, melt-extruded, large-diameter fibers which have been mechanically-calendered, air-laid, or spunbonded. These fibers have average diameters in the general range of 50 µm to 1000 µm.

Such non-woven webs with large-diameter fibers can be prepared by a spunbond process which is well known in the art. (See, e.g., U.S. Pat. Nos. 3,338,992, 3,509,009, and 3,528,129, the fiber preparation processes of which are incorporated herein by reference.) As described in these references, a post-fiber spinning web-consolidation step (i.e., calendering) can be required to produce a self-supporting web. Spunbonded webs are commercially available from, for example, AMOCO, Inc. (Napierville, Ill.).

Non-woven webs made from large-diameter staple fibers can also be formed on carding or air-laid machines (such as a Rando-Webber™, Model 12BS made by Curlator Corp., East Rochester, N.Y.), as is well known in the art. See, e.g., U.S. Pat. Nos. 4,437,271, 4,893,439, 5,030,496, and 5,082,720, the processes of which are incorporated herein by reference.

A binder is normally used to produce self-supporting webs prepared by the air-laying and carding processes and is optional where the spunbond process is used. Such binders can take the form of resin systems which are applied after web formation or of binder fibers which are incorporated into the web during the air laying process. Examples of such resin systems include phenolic resins and polyurethanes. Examples of common binder fibers include adhesive-only type fibers such as Kodel™ 43UD (Eastman Chemical Products; Kingsport, Tenn.) and bicomponent fibers, which are available in either side-by-side form (e.g., Chisso ES Fibers, Chisso Corp., Osaka, Japan) or sheath-core form (e.g., Melty™ Fiber Type 4080, Unitika Ltd., Osaka, Japan). Application of heat and/or radiation to the web "cures" either type of binder system and consolidates the web.

Generally speaking, non-woven webs comprising macrofibers have relatively large voids. Therefore, such webs have low capture efficiency of small-diameter particulate which is introduced into the web. Nevertheless, particulate can be incorporated into the non-woven webs by at least four means. First, where relatively large particulate is to be used, it can be added directly to the web, which is then calendered to actually enmesh the particulate in the web (much like the PTFE webs described previously). Second, particulate can be incorporated into the primary binder system (discussed above) which is applied to the non-woven web. Curing of this binder adhesively attaches the particulate to the web. Third, a secondary binder system can be introduced into the web. Once the particulate is added to the web, the secondary binder is cured (independent of the primary system) to adhesively incorporate the particulate into the web. Fourth, where a binder fiber has been introduced into the web during the air laying or carding process, such a fiber can be heated above its softening temperature. This adhesively captures particulate which is introduced into the web. Of these methods involving non-PTFE macrofibers, those using a binder system are generally the most effective in capturing particulate. Adhesive levels which will promote point contact adhesion are preferred.

Once the particulate has been added, the loaded webs are typically further consolidated by, for example, a calendering process. This further enmeshes the particulate within the web structure.

Webs comprising larger diameter fibers (i.e., fibers which average diameters between 50 µm and 1000 µm) have relatively high flow rates because they have a relatively large mean void size.

2. Microfibers

When the fibrous web comprises non-woven microfibers, those microfibers provide thermoplastic, melt-blown polymeric materials having sorptive or active particulate dispersed therein. Preferred polymeric materials include polyolefins such as polypropylene and polyethylene, preferably further comprising a surfactant, as described in, for example, U.S. Pat. No. 4,933,229, the process of which is incorporated herein by reference. Alternatively, surfactant can be applied to a blown microfibrous (BMF) web subsequent to web formation. Particulate can be incorporated into BMF webs as described in U.S. Pat. No. 3,971,373, the process of which is incorporated herein by reference.

Microfibrous webs of the present invention have average fiber diameters up to 50 µm, preferably from 2 µm to 25 µm, and most preferably from 3 µm to 10 µm. Because the void sizes in such webs range from 0.1 µm to 10 µm, preferably from 0.5 µm to 5 µm, flow through these webs is not as great as is flow through the macrofibrous webs described above.

3. Porous membranes can be provided by methods known in the art. Such porous membranes can be, for example, polyolefin, including PTFE and polypropylene, and polyamide, polyester, and glass, quartz, or ceramic fibers, or any combination of the foregoing, which porous membranes can be coated with finely divided gold by any of the methods, including sputtering and gold salt reduction, known in the art to provide porous reactive supports of the invention. Porosity of membranes before and after immobilization of gold is sufficient to allow passage of fluids containing mercury.

In each of these methods, diffusion and reaction kinetics determine the rates at which insoluble, elemental gold is transformed into the insoluble gold-mercury amalgam. The time for diffusion is a function of the distance an analyte must migrate before contacting a particle and is estimated by Equation 1 where $t_d$ is the diffusion time, d is the distance between particles, and D is the diffusion coefficient for the fluid involved.

Equation 1. $t_d = d^2/2D$

To optimize these criteria we investigated: (1) incorporation of metallic gold using 99.95% purity, 2–5 micrometer spherical gold particulate obtained from Johnson Matthey Co., Ward Hill, Mass., (2) sputtering gold onto high surface area metal oxide substrates such as silica, zirconia, or the gold can be sputtered onto any porous substrate such as polyamide, PTFE, polyolefin (preferably polypropylene). A sample of gold sputtered coated particulate was prepared using 8–10 micrometer silica (Varian Associates, Harbor City, Cal.), and (3) coating methanolic solutions of gold chloride (Aldrich Chemical Co., Milwaukee Wis.) onto these substrates with subsequent reduction to metallic gold. This latter approach using silica or other sorptive particulate coated with gold chloride and subsequently, employing a reduction step (preferably using formaldehyde as reducing agent) to obtain elemental gold is the preferred method for this application. The method of the invention utilizes immobilized gold containing particles within a composite membrane or particle packed columns.

The method of the invention relating to separating mercury from fluids can be practiced using devices such as passive or dynamic air monitoring badges or cassettes.

Objects and advantages of this invention are further illustrated by the following examples, but the particular materials and amounts thereof recited in these examples, as well as other conditions, and details, should not be construed to unduly limit this invention.

EXAMPLES

Example 1

In this example, Sample 1 was prepared by dissolving 300 mg of $AuCl_3$ (Auric Chloride, Aldrich Chemical Co., Milwaukee, Wis.) in 20 mL of methanol and this solution was mixed with 10 grams of chromatographic grade 8–10 micrometer diameter silica particulate, 60 to 80 Å internal pore (Varian Associates, Harbor City, Cal.). The resultant slurry was stirred for five minutes to insure adequate coating of the silica with the $AuCl_3$ solution. The slurry was then transferred to a porcelain crucible and heated at 40°–50° C. until most of the methanol was removed by evaporation. The crucible was then heated to redness (approximately 600° C.) and allowed to cool to room temperature. The coated particulate obtained was a relatively uniformly coated, purple colored particulate containing 2% by weight gold. The purple coloration was indicative of finely divided colloidal gold. A composite membrane comprising 10% PTFE and 90% by weight of the gold coated silica was then prepared as described for sorptive particulate in U.S. Pat. No. 5,071,610.

Example 2

In this example, Sample 2 was prepared using zirconia as the substrate for the gold coated particulate because of its greater stability in basic solutions. Forty grams of zirconia particulate, about 8 micrometer size (prepared as disclosed in U.S. Pat. No. 5,015,373, Example 5) were placed in a 500 mL round bottom flask to which was added a solution of 1.8 grams of $AuCl_3$ in 200 mL of 0.15M HCl in anhydrous methanol. (This corresponds to a 3% by weight loading of gold on the zirconia particulate). The flask was shaken to ensure good mixing and the methanol was then removed in a flash vacuum evaporator with constant tumbling. The resulting gold chloride coated zirconia powder was a pale orange color. The gold chloride coated zirconia powder was then treated with 70 mL of 6% sodium borohydride in water to reduce the ionic gold to elemental gold. A vigorous reaction resulted and the powder turned almost black indicating an efficient conversion of ionic gold to metallic colloidal gold. The coated particulate was allowed to settle and was washed once with 100 mL of distilled water followed by two 300 mL methanol washes and one 300 mL wash with methyl t-butyl ether. The slurry was transferred to an evaporating dish and brought to complete dryness at 40°–50° C. The resulting gold coated particulate had a light purple color. Membranes were prepared with this particulate as described in U.S. Pat. No. 5,071,610, see Example 1.

Example 3

In this example, Sample 3 was prepared by pretreating 30 grams of zirconia (same as used in Example 2) with phosphate. The zirconia was placed in a centrifuge bottle and mixed with 100 mL of 10% (w/w) phosphoric acid in water. This was centrifuged to isolate the solid particulate which was then washed with 500 mL of water followed by 200 mL of 100 grams/liter trisodium phosphate. The resulting powder was then washed twice with 500 mL of water and once with 500 mL of methanol. The excess methanol was removed and the zirconia slurry transferred to a 500 mL round bottom flask. A solution of 2.3 grams of auric chloride in 400 mL of 90% methanol in water was added to the zirconia slurry in the flask. This was thoroughly mixed and the solvent was removed by flash evaporation. Two grams of sodium borohydride was then dissolved in 100 mL of 70% methanol and immediately mixed with the dry gold coated zirconia powder. A vigorous reaction took place and the zirconia powder turned very dark. The excess liquid was removed by decanting and the product washed once with water, once with methanol and once with acetone (500 mLs each). Excess solvent was removed by evaporation at low heat and the resulting dark purple powder contained 5% by weight elemental gold. Membranes were prepared with this particulate as described in U.S. Pat. No. 5,071,610, Example 1. This trial showed that the phosphate treated zirconia was able to adsorb higher levels of gold chloride than the bare zirconia.

Example 4

In this example, Sample 4 was prepared by placing 20 grams of silica (same as in Example 1) in a round-bottom flask and mixing with a solution of 1 gram of auric chloride in 200 mL of 0.02M HCl in methanol. The mixture was evaporated to dryness and the resulting light orange powder was mixed with 1 gram of calcium hydroxide powder (this caused the resulting mixture to turn grayish). A portion of this powder mixture was heated in a 5% hydrogen, 95% argon atmosphere to 250° C. for twenty minutes. The resulting powder was dark purple to black in color indicating a high level of colloidal gold was deposited on the silica particulate. The second portion of Sample 4 was heated to 450° C. for 20 minutes in this hydrogen atmosphere. This resulted a pinkish colored powder. Membranes were prepared with this particulate as described in U.S. Pat. No. 5,071,610.

Example 5

Approximately 10 grams of silica (8–10 micrometer diameter particulate, Varian Associates, Harbor City, Cal.) were placed in the lid of a plastic petri dish which was inserted into a Hummer VII Sputter Coater (Anatech Ltd., Alexandria, Va.). The coater was set up to coat 30 nm thickness at a rate of 4 nm/min. The coater did not have a way to measure thickness; rather, it used the current in the plasma taken by a time factor to determine thickness. After the 30 nm coating, the particulate was agitated to expose new surfaces. This process was repeated until 90 nm was added to the silica in the petri dish lid. The resulting particulate had a purple coloration typical of finely divided elemental gold.

Example 6

Commercially available porous filtration webs (Cole-Parmer, Chicago, Ill.) were sputter-coated on the same apparatus described in Example 5. In this case, only one side of the web was coated. These webs were in the form of disks, 47 millimeter in diameter and had pore sizes of 0.2 micrometer. The webs coated were nylon, polytetrafluoroethylene (PTFE), and polypropylene. The coating thickness on all the webs was 90 nanometers. An additional PTFE web was coated to a gold thickness of 30 nanometers. The coated webs had the appearance of metallic gold in color on the coated side only. This is in contrast to the purple coloration of the material prepared for Example 5 because of difference in gold particle size. Similar webs can be prepared using any of a variety of commercially available filtration webs.

To evaluate the porosity, the webs were mounted in a 25 mm Millipore filtration (Millipore Corp., Marlborough, Mass.) apparatus. Using vacuum, methanol and water were pulled through the webs, demonstrating porosity.

Example 7

In this example, 50 milligrams of gold chloride were dissolved in 2 mLs 1.5 molar hydrochloric acid in methanol. Six mLs of isopropanol were added to this solution followed by 800 milligrams of acidic alumina (75 to 150 micrometer diameter, Bio Rad Inc., Hercules, Cal.). Sixty mLs of hexane were then added and the slurry was mixed thoroughly. The precipitate was then separated and air dried. The dry particulate was then placed in a flask and heated to 170° C. under a stream of hydrogen gas. The purple colored particulate was then washed several times sequentially with water, methanol, and acetone. This particulate was then air dried.

Example 8

In this example 80 milligrams of gold chloride were dissolved in 2 mLs of 1.5 molar hydrochloric acid in methanol. Six mLs of isopropanol were added to this solution followed by 800 milligrams of 100 micrometer diameter silica particulate with 300 Angstrom internal pores (DAVISIL™, W. A. Grace Inc., Baltimore, Md.). Sixty mLs of hexane were then added and the mixture thoroughly mixed. The gold chloride coated particulate was then separated from the liquid phase and air dried. It was then heated to 170° C. under a stream of hydrogen which reduced the ionic gold species to elemental gold resulting in a deep purple colored particulate. This particulate was then washed several times sequentially with water, methanol, and acetone followed by air drying.

Example 9 Mercury in Air Samples: Passive Sampling; gold-coated silica particles Gold-coated silica particulate, prepared according to Example 8, was incorporated into a composite web comprising 10% PTFE and 90% particulate, as described for sorptive particulate in U.S. Pat. No. 5,071,610. Four 33-mm diameter disks of the web were placed in a passive sampling diffusion cassette (Model 3500 Organic Vapor Monitor, 3M, St. Paul, Minn.) and the cassettes were placed in a standard mercury vapor generating apparatus (*Am. Ind. Hyg. Assoc. J.* 38 378 (1977)) for 290 min.

Each of the four webs, along with a non-exposed blank web, was treated with a 3:1 mixture of hydrobromic acid (48% aq. solution): concentrated nitric acid as follows: Each disk was placed in a 47 mm diameter Millipore extraction apparatus that had been adapted to hold the 33 mm diameter sample disks without seepage around the edge of the disks. A small amount of the HBr:HNO₃ was placed on the sample for 3 minutes, then pulled through the disk under aspirator vacuum. The disk was washed with a small amount of water, and the combined washings were diluted for direct analysis of mercury using a model ARL-3410 Inductively Coupled Plasma (ICP) spectrometer (Applied Research Laboratories, Valencia, Cal.) equipped with a Cetac ultrasonic nebulizer, measuring at 194.227 nm. Results of the analyses are presented in Table 1, below.

TABLE 1

| Sample | μg Hg Recovered* |
|---|---|
| 1 | 1.298 |
| 2 | 1.325 |
| 3 | 1.098 |
| 4 | 1.300 |
| Blank 1 | 0.423 |

*Theoretical Hg available = 1.466 μg

Example 10 Mercury in Air Samples: Dynamic Sampling; gold coated silica particles A microporous PTFE web, as described in Example 9, was cut into 25 mm diameter disks and disks were inserted into 25 mm diameter Millipore Swinnex™ cassettes adapted for active air sampling. Two of the cassettes were connected in parallel so that air being sampled passed through two particle-loaded webs before exiting the second cassette. Three sets of two cassettes were assembled and subjected to air containing mercury vapor generated by the apparatus described in Example 9. Air from the mercury vapor generator was pulled through the two cassettes with aspirator vacuum at the rate shown in Table 2. A pair of webs was assembled in a fourth set of cassettes as blanks. Each of the webs was eluted with HBr:HNO₃, as described above, and the amount of mercury in each web was determined by ICP spectrometry. Results of the test are shown in Table 2. In each case, mercury-loaded air impinged on Sample A before Sample B.

TABLE 2

| Sample | Time, min. | Flow rate, L/min. | Theoretical Hg/sample, μg | Measured Hg/sample, μg |
|---|---|---|---|---|
| 5A | 10 | 1.08 | 1.05 | 1.16 |
| 5B | 10 | 1.08 | — | 0.36 |
| 5B* | 10 | 1.08 | — | 0.09 |
| 6A | 20 | 0.98 | 1.90 | 1.69 |
| 6B | 20 | 0.98 | — | 0.30 |
| 7A | 30 | 1.02 | 2.97 | 2.42 |
| 7B | 30 | 1.02 | — | 0.27 |
| Blank A | 0 | 0 | — | 0.43 |
| Blank B | 0 | 0 | — | 0.27 |

*second eluate of 5B.

Data in this table shows that essentially all of the mercury in the air samples was retained on the first membrane, and that from 80–90% of the mercury was retained by the gold-coated particles in the web.

Example 11 Preparation of gold-coated alumina (Al₂O₃) particles 120 g of wide-pore alumina (Scientific Adsorbents, Inc., Cat. #0.0012005-99, Atlanta, Ga.) was mixed with 600 ml of 1N NaOH and heated to approximately 40° C. for 20 minutes. Water was added to bring the volume of the slurry to approximately 1500 mL and fines were removed by elutriation. Two additional water washes of approximately 1000 mL were used to remove additional fines. The alumina was collected on a filter funnel and washed with 2×600 mL water. The final wash had a pH of approximately 9 to 10. Next, the alumina was washed with 2×500 mL acetone, then allowed to dry in air to a free-flowing powder.

A solution of 1.85 g AuCl$_3$ in a minimal amount of methyl alcohol was added to 600 mL of methyl t-butyl ether (MTBE), and this solution was then added to a slurry of the alumina in 600 mL MTBE, with constant stirring. The resulting supernatant liquid was colorless, indicating that all of the gold chloride was bound to the alumina.

A solution of 30 mL 37% formaldehyde, 90 mL acetone and 300 mL MTBE was prepared and immediately added to the gold-coated alumina, with vigorous stirring. After approximately 3 hours of stirring the alumina particles were a deep purple color, indicating complete reduction of the gold chloride coating to elemental gold. The supernatant solvent was decanted and the gold-coated alumina was collected on a filter funnel and washed with 300 mL acetone followed by 300 mL methyl alcohol. The alumina was slurried in 500 mL of 1N NaOH, collected on a funnel, washed with 3×500 mL water, and dried in a vacuum oven at 70° C. until it became a free-flowing powder.

Example 12 Mercury in Air Samples: Passive Sampling; gold coated alumina particles Gold-coated alumina particulate, prepared according to Example 11, was incorporated into a composite membrane comprising 10% PTFE and 90% particulate, as described for sorptive particulate in U.S. Pat. No. 5,071,610. Ten samples of the membrane, cut into 33 mm diameter disks and placed in 3M model 3500 Organic Vapor Monitors, were exposed to mercury vapor in air, using the mercury generation apparatus as described in Example 9. Mercury and gold were eluted with HBr:HNO$_3$ as previously described, and mercury was measured by ICP spectrometry. Results are shown in Table 3, below.

TABLE 3

| Sample | Exposure time, min. | Predicted Hg/sample, µg | Measured Hg/sample, µg |
|---|---|---|---|
| 8 | 10 | 0.06 | 0.12 |
| 9 | 82 | 0.51 | 0.36 |
| 10 | 142 | 0.88 | 0.68 |
| 11 | 202 | 1.25 | 0.85 |
| 12 | 262 | 1.62 | 1.16 |
| 13 | 386 | 2.38 | 1.66 |
| Blank 2 | 0 | 0 | 0.06 |
| Blank 3 | 0 | 0 | 0.06 |
| 14 | 60 | 0.37 | 0.38 |
| 15 | 120 | 0.74 | 0.63 |
| 16 | 180 | 1.11 | 1.03 |
| 17 | 336 | 2.07 | 2.03 |
| Blank 4 | 0 | 0 | 0.13 |

Data presented in the table shows that gold-coated alumina particles in the microporous membrane effectively absorb mercury from air, under passive conditions.

Example 13 Mercury in Air Samples: Dynamic Sampling; gold coated alumina particles Single 25 mm diameter samples of gold-coated alumina-containing membranes, as prepared in Example 12, were placed in 25 mm diameter active sampling cassettes (Millipore Swinnex™ cassettes), and exposed to mercury vapor at a rate of approximately 1.0 liter/minute. The amount of mercury obtained from each disk is shown in Table 4, below.

TABLE 4

| Sample | Exposure time, min. | Predicted Hg/sample, µg | Measured Hg/sample/µg |
|---|---|---|---|
| 18 | 3 | 0.23 | 0.17 |
| 19 | 10 | 0.81 | 0.73 |
| 20 | 20 | 1.58 | 1.52 |
| 21 | 45 | 3.69 | 3.86 |
| Blank 5 | 0 | 0 | 0.00 |
| Blank 6 | 0 | 0 | 0.03 |

Data in Table 4 show that gold-coated alumina particles in a microporous membrane can effectively absorb mercury from moving air. These data also confirm results presented in Table 2, above, that a second membrane is not needed to absorb essentially all of the mercury in an active sampling device.

Example 14 One-step ionic mercury reduction and gold amalgam formation

A. Gold-coated silica particles were prepared as follows:

1. Ten grams of 35–70 micrometer diameter Davisil™ silica (300 Angstrom internal pore size), Alltech, Dearfield, Ill., were washed twice with 200 mL portions of water followed by two washings with 200 mL portions of 1M NaOH followed by three washes with 200 mL portions of water. The washed silica was mixed with 300 mLs of 2 percent weight/volume stannous chloride (Sigma Chemical Co., St. Louis, Mo.) and allowed to soak for about 10 minutes. Excess stannous chloride was washed out in subsequent steps and stannous chloride treated silica remained. The silica was washed three times with 200 mL portions of water and then twice with 200 mL portions of methanol. The methanol was removed by vacuum drying without heat.

A gold solution was prepared by dissolving 150 milligrams of gold(II) chloride, Aldrich Chemical Company, Milwaukee, Wis., in 10 mLs of a mixture of 9 parts (volume) isopropanol and 1 part 1M HCl (anhydrous) in ethyl ether, to which was added 300 mLs of hexane.

The stannous chloride treated silica was then mixed with the gold chloride solution and allowed to stir at very slow speed until all the gold chloride was adsorbed (solution was no longer colored yellow). The solution was filtered and the particulate washed with two 200 mL portions of hexane followed by two 200 mL portions of isopropanol and two 200 mL portions of methanol. Washing was continued with three 200 mL portions of deionized water followed by two 200 mL portions with methanol and two 200 mL portions of acetone. The purplish red gold coated silica was vacuum dried at room temperature.

B. Stannous chloride-coated gold-coated silica particles were prepared as follows: 1.5 grams of the gold coated particles were soaked in 25 mLs of a 5 percent by weight aqueous stannous chloride solution for two hours. The coated particulate was recovered by filtering the solution through Number 41 Whatman filter paper (Whatman International Ltd., Maidstone, England). The particulate was dried at 100° C. for two hours. One cc of the dried particulate comprising elemental gold and adsorbed stannous chloride was packed into a 0.7 millimeter diameter column for testing.

A 20 mL solution of a 1 part per million (1.00 micrograms per mL) by weight ionic mercury prepared from mercuric nitrate, SPEX Industries, Inc., Edison, N.J., and 5 percent sulfuric acid was passed through the column. The resulting Effluent A was collected for subsequent analysis. The gold-mercury amalgam on the column was dissolved and eluted with 2.0 mLs of a solution comprising 1.5 mLs of hydrobromic acid and 0.5 mLs of nitric acid. This elution was followed with a deionized water wash to give a total Effluent B volume of 25 mLs for subsequent analysis. Effluents A, B, and the original sample were analyzed using ICP spectrometry as described in Example 9. No mercury was found in Effluent A indicating that the mercuric ion either was reduced by the stannous chloride to elemental mercury which was then immobilized by formation of the mercury-gold amalgam or mercuric ion was adsorbed by the tin salt treated particles. Effluent B contained 1.02 micrograms of mercury per mL, indicating that complete recovery of ionic mercury either by sorption on the tin salt or by reduction of ionic mercury to elemental mercury and subsequent amalgamation with gold was achieved in a one-step process.

Various modifications and alterations of this invention will become apparent to those skilled in the art without departing from the scope and spirit of this invention, and it should be understood that this invention is not to be unduly limited to the illustrative embodiments set forth herein.

We claim:

1. A method for separating mercury from fluids comprising the step of:
   a) contacting and passing a fluid comprising mercury through a porous support comprising a porous substrate on which is immobilized finely divided high surface area elemental gold having a surface area in the range of 5 to 100 $m^2/g$, said porous support having gold immobilized thereon being enmeshed in a porous fibrous web, said immobilized gold being present in domains having a maximum dimension in the range of 1 to 100 nm, to provide a gold-mercury amalgam immobilized on said porous support which is enmeshed in said porous fibrous web.

2. The method according to claim 1 further comprising the step of:
   b) converting ionic mercury to elemental mercury prior to step a).

3. The method according to claim 2 further comprising the step of converting covalently bonded mercury to ionic mercury prior to step b).

4. The method according to claim 1 further comprising the step of removing elemental mercury from said gold-mercury amalgam.

5. The method according to claim 1 wherein said substrate for said porous support is selected from the group consisting of silica, alumina, and zirconia.

6. The method according to claim 1 wherein said porous fibrous web is selected from the group consisting of polyamide, polyolefin, polyester, polyurethane, polyvinylhalide, glass, quartz, ceramic, and combinations thereof.

7. The method according to claim 6 wherein said porous fibrous web comprises polytetrafluoroethylene.

8. The method according to claim 6 wherein said porous fibrous web comprises glass.

9. The method according to claim 6 wherein said porous fibrous web comprises quartz.

10. The method according to claim 6 wherein said porous fibrous web comprises ceramic.

11. The method according to claim 1 wherein said support having gold immobilized thereon which is enmeshed in a porous fibrous web is a mercury monitoring device.

12. The method according to claim 1 further comprising the step of sorbing a tin salt on said porous support prior to step a).

13. The method according to claim 12 further comprising the step of removing mercury from said mercury-sorbed tin salt.

14. The method according to claim 1 wherein said finely divided elemental gold is immobilized by reducing a gold salt that has been coated on said porous substrate.

15. The method according to claim 1 wherein said finely divided elemental gold is immobilized by sputtering.

* * * * *

UNITED STATES PATENT AND TRADEMARK OFFICE
CERTIFICATE OF CORRECTION

PATENT NO. : 5,492,627
DATED : February 20, 1996
INVENTOR(S) : Donald F. Hagen et al.

It is certified that error appears in the above-indentified patent and that said Letters Patent is hereby corrected as shown below:

On the title page, under Foreign Patent Documents, add -- FR 75 15579 --.

Signed and Sealed this

Tenth Day of September, 1996

*Attest:*

BRUCE LEHMAN

*Attesting Officer*     *Commissioner of Patents and Trademarks*